US011495983B2

(12) United States Patent
Zagrodnik

(10) Patent No.: US 11,495,983 B2
(45) Date of Patent: Nov. 8, 2022

(54) ELECTRICAL POWER SUPPLY SYSTEM

(71) Applicant: Rolls-Royce plc, London (GB)

(72) Inventor: Michael A. Zagrodnik, Derby (GB)

(73) Assignee: ROLLS ROYCE plc, London (GB)

( * ) Notice: Subject to any disclaimer, the term of this patent is extended or adjusted under 35 U.S.C. 154(b) by 187 days.

(21) Appl. No.: 17/079,740

(22) Filed: Oct. 26, 2020

(65) Prior Publication Data

US 2021/0143657 A1   May 13, 2021

(30) Foreign Application Priority Data

Nov. 7, 2019 (GB) ..................................... 1916189

(51) Int. Cl.
*H02J 7/00* (2006.01)
*H02J 1/12* (2006.01)
*H02M 3/155* (2006.01)

(52) U.S. Cl.
CPC .............. *H02J 7/0068* (2013.01); *H02J 1/12* (2013.01); *H02J 7/007194* (2020.01); *H02M 3/155* (2013.01)

(58) Field of Classification Search
CPC ...... H02J 7/0068; H02J 1/12; H02J 7/007188; H02M 3/00; H02M 3/155; H02M 3/1582
USPC .......................................................... 320/137
See application file for complete search history.

(56) References Cited

U.S. PATENT DOCUMENTS

| 9,083,065 B2* | 7/2015 | Carkner ............. H01M 10/615 |
| 10,730,403 B2* | 8/2020 | Porras ..................... B60L 58/27 |
| 10,974,836 B2* | 4/2021 | Harwood ................... H02J 3/46 |
| 2012/0126753 A1 | 5/2012 | Carkner |
| 2014/0239903 A1* | 8/2014 | Choi ................. H02J 7/007194 320/128 |
| 2014/0302415 A1* | 10/2014 | Peterson ............. H01M 8/0491 429/434 |
| 2018/0079515 A1 | 3/2018 | Harwood et al. |
| 2018/0345815 A1 | 12/2018 | Porras et al. |

(Continued)

FOREIGN PATENT DOCUMENTS

CN   109 841 923 A   6/2019

OTHER PUBLICATIONS

Feb. 26, 2021 extended Search Report issued in European Patent Application No. 20204957.3.

*Primary Examiner* — Richard Isla
*Assistant Examiner* — Sadia Kousar
(74) *Attorney, Agent, or Firm* — Oliff PLC

(57) ABSTRACT

Electrical power supply system having a DC distribution bus; a rechargeable battery module which delivers DC power to the DC distribution bus in a discharge mode, and absorbs DC power from the DC distribution bus in a recharge mode; a DC/DC converter comprising an inductor and plural switches, the DC/DC converter being connected between the DC distribution bus and the rechargeable battery module; and a heat transfer arrangement configured to transfer heat between the DC/DC converter and the rechargeable battery module. The module has an idling mode of operation in which it neither delivers nor absorbs DC power to/from DC distribution bus, wherein the converter is repeatedly switchable between (i) a ramping-up configuration in which a current is withdrawn from a source, and (ii) a freewheeling configuration in which the current from the ramping-up configuration is isolated from the source to flow in a continuous loop within the converter.

14 Claims, 4 Drawing Sheets

(56) References Cited

U.S. PATENT DOCUMENTS

2019/0115632 A1\* 4/2019 Beuning ............. H01M 10/482
2021/0362608 A1\* 11/2021 Kume .................... B60L 58/24

\* cited by examiner

ELECTRICAL POWER SUPPLY SYSTEM

CROSS-REFERENCE TO RELATED APPLICATIONS

This specification is based upon and claims the benefit of priority from United Kingdom Patent Application Number 1916189.2 filed on 7 Nov. 2019, the entire contents of which are incorporated herein by reference.

FIELD OF THE DISCLOSURE

The present disclosure relates to an electrical power supply system, and particularly, but not exclusively, an electrical power supply system for an aircraft propulsion system.

BACKGROUND

In hybrid electric aircraft, the batteries may not be required for the full duration of a flight. For example, the batteries may be required to assist only during take-off, with the batteries providing a great deal of power for e.g. the first five minutes of the flight, but for the remainder of the flight remaining dormant, except perhaps for a time period when the battery cells are recharged during the flight.

Battery modules are typically positioned in an area of the aircraft which is neither heated nor pressurized. There may therefore be long periods of time where the batteries are exposed to very low ambient temperatures during flight, e.g. −40° C. or colder.

Such low temperatures are not necessarily detrimental to the cells, but it may be important that the battery modules are ready for service at any time during the flight, and typically an optimal temperature range for battery operation is between 10° C. and 35° C. Thus despite their location, the temperature of the batteries must be maintained at a level where power can be drawn from the cells.

One option is to incorporate resistive heating pads within the battery modules. During flight the heating pads can be activated to keep the batteries warm. However, the use of such pads increases the complexity, weight and cost of the modules.

Another option is to cycle the batteries, repeatedly discharging the batteries into a high voltage DC distribution bus of the aircraft (or an external resistive load) and then recharging in short cycles. However, this increases the number of charge-discharge cycles imposed upon the cells, contributing to shorter battery life.

There is therefore a need for a different approach to achieve in flight heating of battery modules, preferably without increasing battery module weight or complexity, and without increasing the charge-discharge cycle stress imposed upon the cells.

SUMMARY

According to a first aspect of the present disclosure there is provided an electrical power supply system having:
a DC distribution bus;
a rechargeable battery module which delivers DC power to the DC distribution bus in a discharge mode of operation, and absorbs DC power from the DC distribution bus in a recharge mode of operation;
a DC/DC converter comprising an inductor and plural switches, the DC/DC converter being operatively connected between the DC distribution bus and the rechargeable battery module; and
a heat transfer arrangement configured to transfer heat between the DC/DC converter and the rechargeable battery module;
wherein the rechargeable battery module also has an idling mode of operation in which it neither delivers DC power to nor absorbs DC power from the DC distribution bus;
wherein the DC/DC converter is arranged such that, in the idling mode of operation, the DC/DC converter is repeatedly switchable between (i) a ramping-up configuration of the switches in which a current is withdrawn from a source which is one of the DC distribution bus and the rechargeable battery module, flows through the inductor and is returned to said source, and (ii) a freewheeling configuration of the switches in which the current from the ramping-up configuration is isolated from said source to flow in a continuous loop within the converter; and
wherein the electrical power supply system further has a controller which is configured to control the repeated switching between the ramping-up configuration and the freewheeling configuration such that, in the idling mode of operation, heat resulting from the repeated switching and the current flow produced thereby in the DC/DC converter is transferred by the heat transfer arrangement from the DC/DC converter to heat the rechargeable battery module.

In this way, both the DC/DC converter and the rechargeable battery module can be kept warm without recourse to resistive heating pads and the associated componentry and switches which they would entail, and also without increasing the charge-discharge cycle stress imposed upon the cells of the battery module.

The electrical power supply system may further have: a generator and an AC/DC converter which converts AC power produced by the generator into DC power and delivers that DC power to the DC distribution bus; and a motor and a DC/AC converter which converts DC power absorbed from the DC distribution bus into AC power and delivers that AC power to the motor. In this case, a second aspect of the present disclosure provides an aircraft propulsion system having such an electrical power supply system; and further having a gas turbine engine which powers the generator, and a propulsive fan or propeller which is powered by the motor. Indeed, a third aspect of the present disclosure provides an aircraft having the propulsion system of the second aspect.

A fourth aspect of the present disclosure provides a method of controlling the temperature of the rechargeable battery module of the electrical power supply system of the first aspect, the method including: operating the rechargeable battery module in the idling operation mode; and using the controller to repeatedly switch the DC/DC converter between the ramping-up configuration and the freewheeling configuration to produce heat that is transferred by the heat transfer arrangement to the rechargeable battery module.

A fifth aspect of the present disclosure provides the controller of the electrical power supply system of the first aspect. Thus a (typically computer-based) controller may be provided which is operable to control the temperature of a rechargeable battery module using a DC/DC converter comprising an inductor and plural switches, wherein the battery module and the DC/DC converter are part of an electrical power supply system having: a DC distribution bus, the rechargeable battery module which delivers DC power to the DC distribution bus in a discharge mode of operation, and absorbs DC power from the DC distribution bus in a recharge mode of operation; the DC/DC converter, which is operatively connected between the DC distribution bus and the rechargeable battery module; and a heat transfer arrangement configured to transfer heat between the DC/DC converter and the rechargeable battery module. The rechargeable battery module also has an idling mode of operation in which it neither delivers DC power to nor absorbs DC power from the DC distribution bus. The controller is configured to control repeated switching between a ramping-up configuration of the switches and a freewheeling configuration of the switches such that, in the idling mode of operation, heat resulting from the repeated switching and a current flow in the DC/DC converter produced thereby is transferred by the heat transfer arrangement from the DC/DC converter to heat the rechargeable battery module. In the ramping-up configuration, the current is withdrawn from a source which is one of the DC distribution bus and the rechargeable battery module, flows through the inductor and is returned to said source. In the freewheeling configuration, the current from the ramping-up configuration is isolated from said source to flow in a continuous loop within the converter.

Optional features of the present disclosure will now be set out. These are applicable singly or in any combination with any aspect of the present disclosure.

The controller may control the frequency of the repeated switching and/or the average current level in the DC/DC converter to control the degree of heating of the rechargeable battery module.

The electrical power supply system may further have a temperature sensor which senses the temperature of the rechargeable battery module and provides the sensed temperature to the controller, which in turn controls the degree of heating of the rechargeable battery module on the basis of the sensed temperature. In this way, closed loop control of the temperature is possible, e.g. using PID (proportional integral derivative) control, preferably with limits to prevent saturation of the inductor.

Preferably, said source is the DC distribution bus. In this way, by avoiding using the battery module as the source, the charge-discharge cycle stress imposed upon the cells of the battery module can be further reduced.

Each switch of the DC/DC converter may comprise an active switching element and a diode connected in anti-parallel with the active switching element. For example, the active switching elements can be insulated-gate bipolar transistors (IGBTs), metal oxide semiconductor field effect transistors (MOSFETs), bipolar junction transistors (BJTs), gate turn-off thyristors (GTOs) or other switching devices with turn-off capability.

The DC/DC converter may further comprise a capacitor which is arranged with the inductor and the plural switches such that the converter operates as a buck boost converter in the discharge and recharge modes of operation. In particular, the switches, inductor and capacitor may be arranged to form a four switch, buck boost converter.

The rechargeable battery module may be a lithium ion battery module.

Conveniently, the heat transfer arrangement may be a fluid coolant circuit which extends to the DC/DC converter and the rechargeable battery module, and which, in the discharge and recharge modes of operation, removes waste heat from the DC/DC converter and the rechargeable battery module. However, another option is for heat transfer to be a simple thermal conductor member which transfers heat by conduction from the DC/DC converter to the rechargeable battery module.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION OF THE DRAWINGS

Embodiments will now be described by way of example only, with reference to the Figures, in which.

DETAILED DESCRIPTION

Aspects and embodiments of the present disclosure will now be discussed with reference to the accompanying figures. Further aspects and embodiments will be apparent to those skilled in the art.

Figure 1:
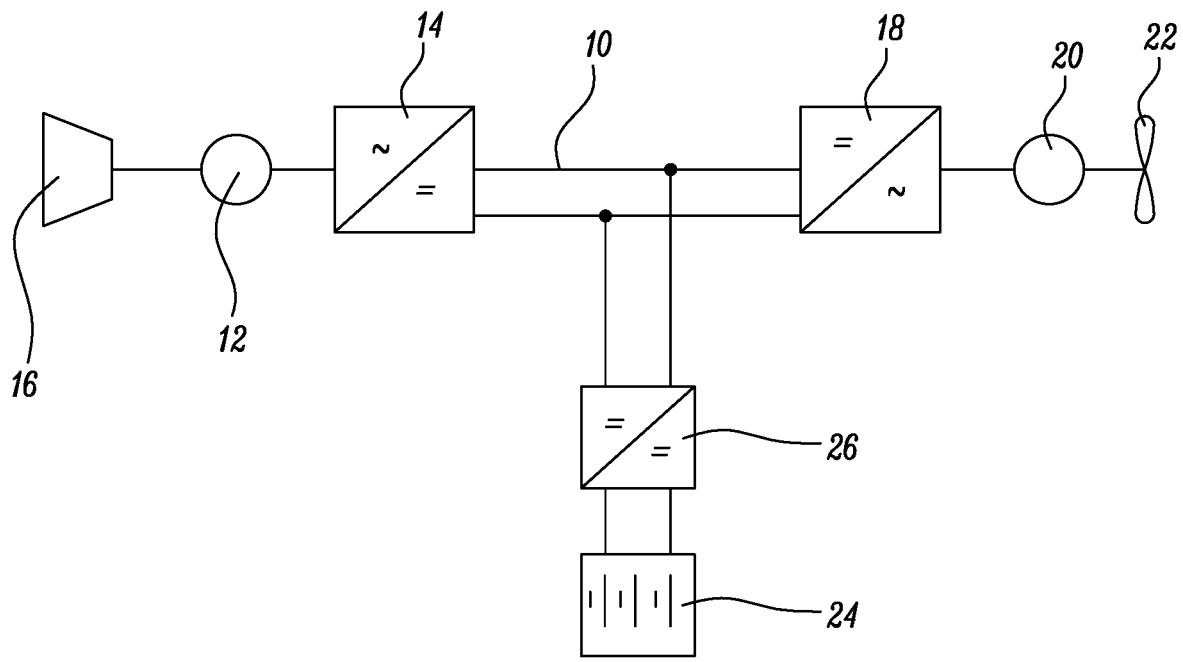
FIG. 1 shows schematically a hybrid electric aircraft propulsion system.

FIG. 1 shows schematically a hybrid electric aircraft propulsion system. The aircraft has a high voltage DC (HVDC) distribution bus 10. A generator 12 produces AC electrical power, which is converted to DC power by an AC/DC converter 14 for feeding into the bus. Conveniently, the generator can be powered by a gas turbine engine 16. Power is withdrawn from the bus by a DC/AC converter 18, which supplies the withdrawn power to a motor 20 and which in turn drives a propulsive propeller or fan 22 of the aircraft.

The propulsion system also has a rechargeable, lithium ion battery module 24 for providing extra power at take-off, and for more generally assisting the regulation of the voltage level in the HVDC distribution bus 10. The battery module delivers DC power to the DC distribution bus in a power delivery mode of operation, and absorbs DC power from the DC distribution bus in a power absorption mode of operation. A DC/DC converter 26 operatively connects the battery module to HVDC distribution bus and helps the AC/DC converter 14 to maintain the voltage level of the bus at a fixed level.

Figure 2:
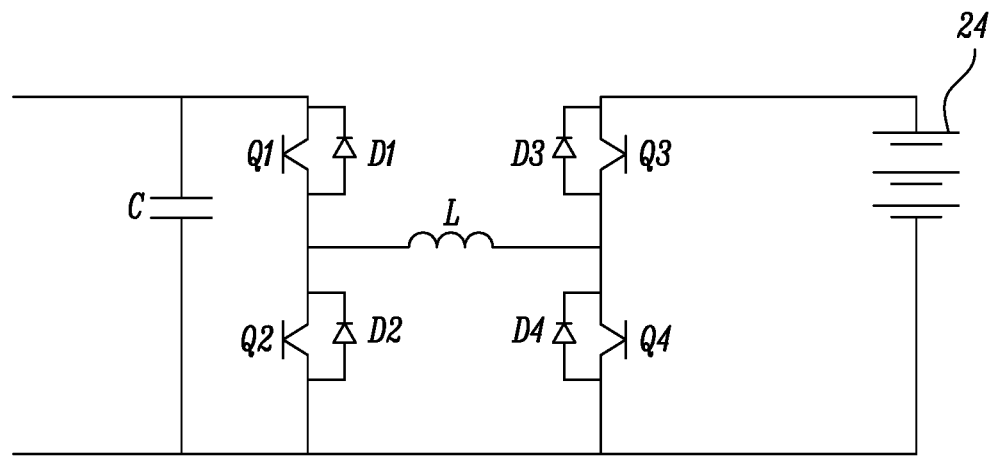
FIG. 2 is a circuit diagram for a DC/DC converter and battery module of the system of FIG. 1.

The DC/DC converter 26 conveniently has a four switch, buck boost topology, as shown in the circuit diagram of FIG. 2. The DC/DC converter of FIG. 2 has four switches, each having an active switching element Q1, Q2, Q3, or Q4 and a diode D1, D2, D3 or D4 connected in anti-parallel with the active switching element. For example, the active switching elements can be insulated-gate bipolar transistors (IGBTs), metal oxide semiconductor field effect transistors (MOSFETs), bipolar junction transistors (BJTs), gate turn-off thyristors (GTOs) or other switching devices with turn-off capability. Two of the switches are connected in series on the bus side of the converter, and the other two switches are connected in series on the battery module side of the converter. An inductor L extends between the two pairs of series-connected switches, and a capacitor C extends in parallel between the pair of series-connected switches on the bus side of the DC/DC converter.

Although the DC/DC converter 26 shown in FIG. 2 has a four switch, buck boost topology, this is not essential and other DC/DC converters having switches and an inductor and operable as described below could be used in accordance with this disclosure.

At times the DC/DC converter 26 operates in a current control mode, injecting current into the bus 10 while the battery module 24 operates in a discharge mode in which DC power is delivered to the bus to assist the generator 12. At other times, the DC/DC converter withdraws current from the bus 10 while the battery module 24 operates in a recharge mode.

Figure 3:
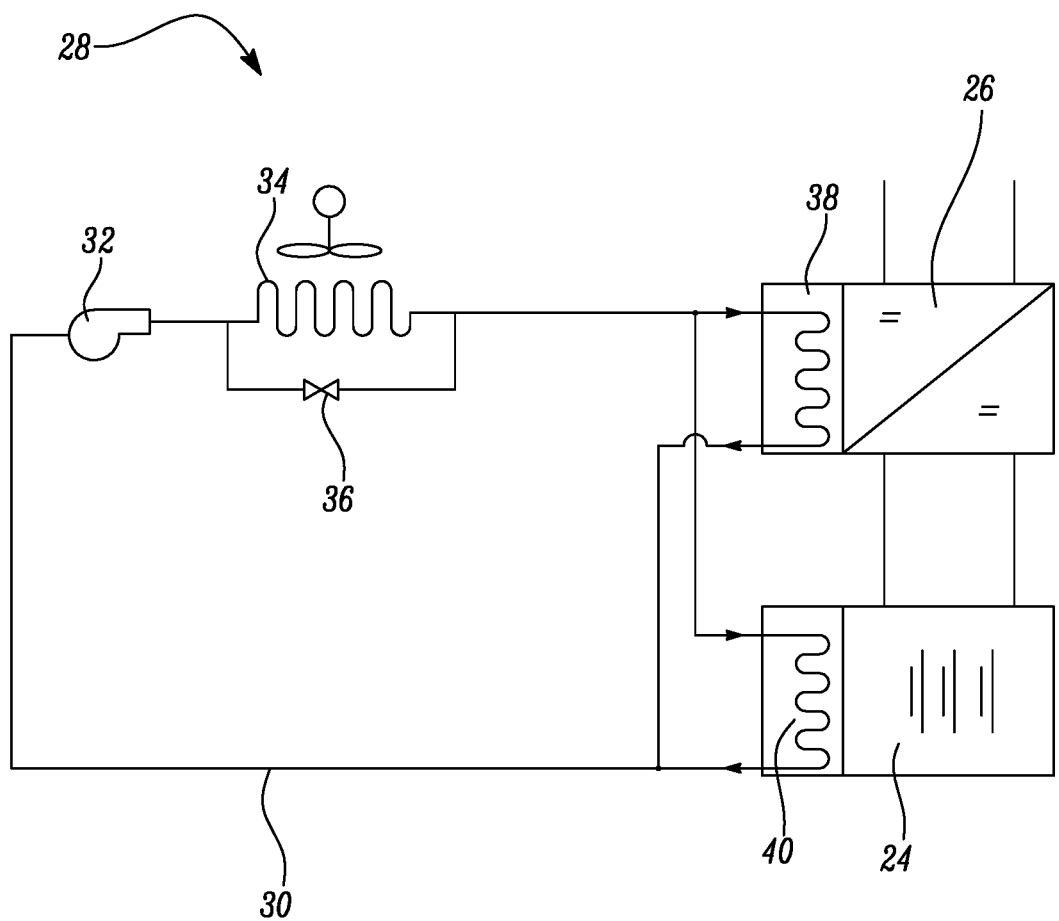
FIG. 3 shows schematically a coolant circuit for removing waste heat from the DC/DC converter and battery module of FIG. 2.

In both the discharge and recharge modes of the battery module 24, the batteries and DC/DC converter 26 generate waste heat due to losses. This heat causes the temperature of the battery cells and converter components to rise. To prevent over-temperature conditions, the waste heat is removed by a coolant circuit 28, shown schematically in FIG. 3. The coolant circuit, which is shared by both the DC/DC converter and the battery module, may comprise: piping 30, a pump 32, a radiator 34, a bypass valve 36 for the radiator, a converter cold-plate 38 and a battery module cold-plate 40. The pumped coolant fluid may be, for example, a 50:50 water glycol mixture.

The battery module 24 also has an idling mode of operation in which it neither delivers DC power to nor absorbs DC power from the HVDC distribution bus 10. When the batteries are idle, which they may be for some time, depending on the flight mission, the temperature of the cells and DC/DC converter 26 may fall significantly, particularly during high altitude or winter flights where the ambient temperature may be −40° C. or lower. Even though the casing of the battery module 24 may be thermally insulated, without precautionary measures being taken it could be possible for the cell temperature to fall outside an optimal operating temperature range (typically of between 10° C. and 35° C.), and even to fall below a safe operating temperature.

Figure 4:
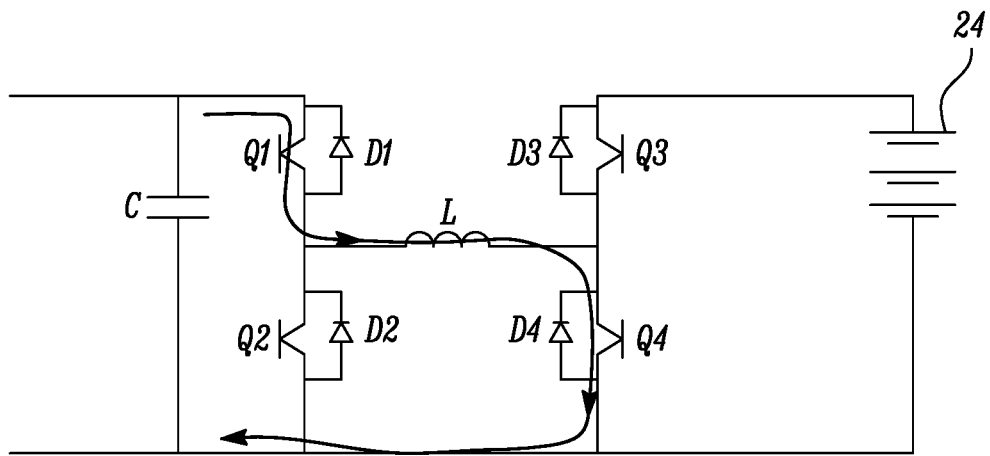
FIG. 4 is the circuit diagram of FIG. 2 overlaid with a current flow for a current ramping-up configuration of switches of the DC/DC converter.
Figure 5:
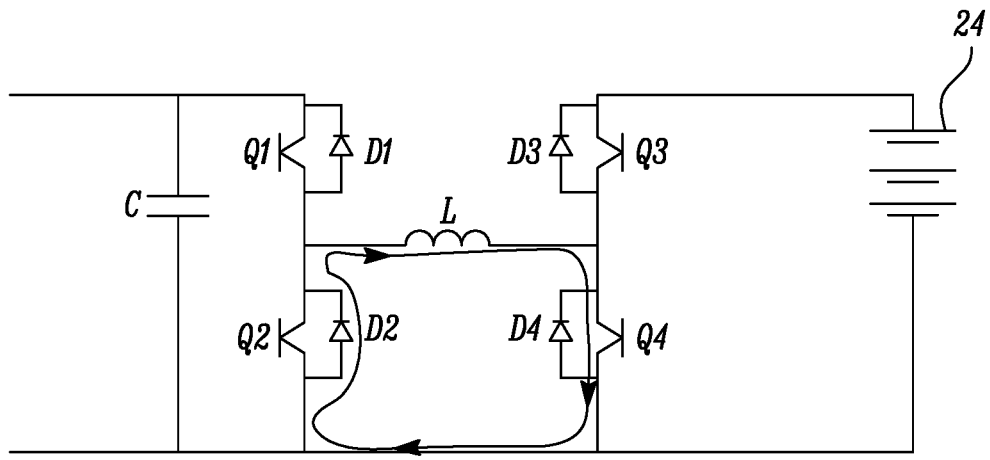
FIG. 5 is the circuit diagram of FIG. 2 overlaid with a current flow for a current freewheeling configuration of the switches of the DC/DC converter.
Figure 6:
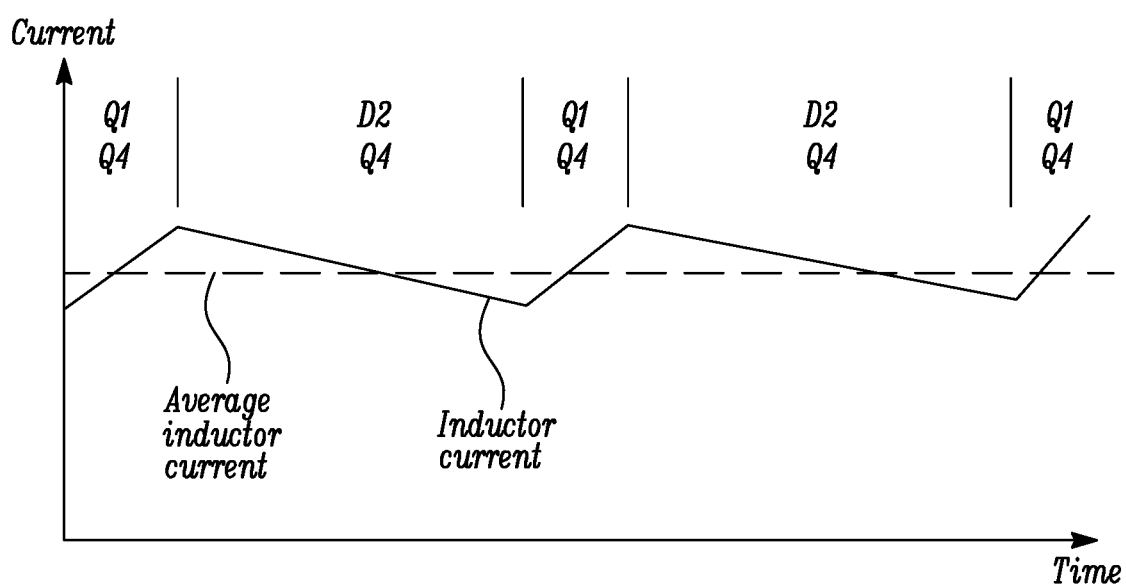
FIG. 6 shows the waveform of an inductor current produced by repeated ramping-up and freewheeling cycles.

Accordingly, the batteries are heated by flowing a current through the inductor L of the DC/DC converter 26. More particularly, the switches of the DC/DC converter are repeatedly switched between a current ramping-up configuration (shown schematically in FIG. 4) and a current freewheeling configuration (shown schematically in FIG. 5). FIG. 6 then shows the waveform of the inductor current, illustrating the repeated ramping-up and freewheeling cycles. In the ramping-up configuration, the active switching elements Q1-Q4 are configured to allow a current to be withdrawn from the HVDC distribution bus 10 through the switching element Q1, flow through the inductor L and return to the bus through the switching element Q4. In the freewheeling configuration, the switching elements are configured to allow the current to flow in a continuous loop around the through the diode D2, the inductor L and the switching element Q4.

The heat generated within the inductor L and more generally in the DC/DC converter 26 is absorbed by the fluid of the coolant circuit 28, and transferred thereby to the battery module 24. Thus both the DC/DC converter and the battery module are kept warm by virtue of sharing the common coolant circuit 28. In this mode of operation, the bypass valve 36 for the radiator 24 can be opened to prevent cooling of the coolant fluid in the radiator. Keeping the converter warm is advantageous as this reduces thermal stress and reduces the possibility of condensation formation, which may occur particularly following a rapid descent into warm moist air.

Heat sources contributing to the total heat flux from the DC/DC converter 26 during the idling mode of operation of the battery module 24 may include:
Copper ohmic losses within the inductor windings
Hysteresis loss within the inductor core
Eddy current losses with the core
Switching losses within the switching elements
Conduction losses within switching elements and diodes The amount of heat generated can be regulated by adjusting the switching frequency and/or average inductor current level. Generally a fixed frequency control scheme is preferred, so that the principal regulation method is by controlling the current level.

The temperature of the battery cells may be maintained at a desired level, for example by PID (proportional integral derivative) closed loop control of the battery module temperature, with current limits imposed to prevent saturation of the inductor. Accordingly, the system may have a temperature sensor (not shown) which senses the temperature of the battery module 24 and provides the sensed temperature to a controller (not shown) for the DC/DC converter 26. This in turn can control the degree of heating of the battery module on the basis of the sensed temperature.

Benefits made attainable by the system are:
Continuously variable level of heat to regulate the temperature of the battery module.
Continuously variable heat control which can avoid temperature hysteresis associated with bang-bang heater systems.
Does not need to draw on the battery module for heating power, and reduces the charge-discharge cycle load on the battery.
Heats up the DC/DC converter at the same time that it heats up the battery module. The converter is then ready for operation at any time if required, thermal stress is reduced, and the possibility of condensation forming particularly during rapid descent is reduced.
The system may be used to warm up battery cells and the DC/DC converter prior to starting after a cold soak.
No need for internal heating elements within the battery module.
No need for external resistors which would be additional components.
No need for additional mechanical contactors or transistor switches.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:
1. An electrical power supply system having:
a DC distribution bus;
a rechargeable battery module which delivers DC power to the DC distribution bus in a discharge mode of operation, and absorbs DC power from the DC distribution bus in a recharge mode of operation;
a DC/DC converter comprising an inductor and plural switches, the DC/DC converter being operatively con- nected between the DC distribution bus and the rechargeable battery module; and a heat transfer arrangement configured to transfer heat between the DC/DC converter and the rechargeable battery module;

wherein the rechargeable battery module also has an idling mode of operation in which it neither delivers DC power to nor absorbs DC power from the DC distribution bus;

wherein the DC/DC converter is arranged such that, in the idling mode of operation, the DC/DC converter is repeatedly switchable between (i) a ramping-up configuration of the switches in which a current is withdrawn from a source which is one of the DC distribution bus and the rechargeable battery module, flows through the inductor and is returned to said source, and (ii) a freewheeling configuration of the switches in which the current from the ramping-up configuration is isolated from said source to flow in a continuous loop within the converter; and wherein the electrical power supply system further has a controller which is configured to control the repeated switching between the ramping-up configuration and the freewheeling configuration such that, in the idling mode of operation, heat resulting from the repeated switching and the current flow produced thereby in the DC/DC converter is transferred by the heat transfer arrangement from the DC/DC converter to heat the rechargeable battery module.

2. The electrical power supply system according to claim 1, wherein the controller controls the frequency of the repeated switching to control the degree of heating of the rechargeable battery module.

3. The electrical power supply system according to claim 1, wherein the controller controls the average current level in the DC/DC converter to control the degree of heating of the rechargeable battery module.

4. The electrical power supply system according to claim 1, further having a temperature sensor which senses the temperature of the rechargeable battery module and provides the sensed temperature to the controller, which in turn controls the degree of heating of the rechargeable battery module on the basis of the sensed temperature.

5. The electrical power supply system according to claim 1, wherein said source is the DC distribution bus.

6. The electrical power supply system according to claim 1, wherein each switch of the DC/DC converter comprises an active switching element and a diode connected in anti-parallel with the active switching element.

7. The electrical power supply system according to claim 1, wherein the DC/DC converter further comprises a capacitor which is arranged with the inductor and the plural switches such that the converter operates as a buck boost converter in the discharge and recharge modes of operation.

8. The electrical power supply system according to claim 1, wherein the rechargeable battery module is a lithium ion battery module.

9. The electrical power supply system according to claim 1, wherein the heat transfer arrangement includes a fluid coolant circuit which extends to the DC/DC converter and the rechargeable battery module, and which, in the discharge and recharge modes of operation, removes waste heat from the DC/DC converter and the rechargeable battery module.

10. The electrical power supply system according to claim 1, wherein the heat transfer arrangement includes a thermal conductor member which transfers heat by conduction from the DC/DC converter to the rechargeable battery module.

11. The electrical power supply system according to claim 1, which further has:

a generator and an AC/DC converter which converts AC power produced by the generator into DC power and delivers that DC power to the DC distribution bus; and a motor and a DC/AC converter which converts DC power absorbed from the DC distribution bus into AC power and delivers that AC power to the motor.

12. An aircraft propulsion system having:

the electrical power supply system according to claim 11;

a gas turbine engine which powers the generator; and a propulsive fan or propeller which is powered by the motor.

13. An aircraft having the propulsion system of claim 12.

14. A method of controlling the temperature of the rechargeable battery module of the electrical power supply system of claim 1, the method including:

operating the rechargeable battery module in the idling operation mode; and using the controller to repeatedly switch the DC/DC converter between the ramping-up configuration and the freewheeling configuration to produce heat that is transferred by the heat transfer arrangement to the rechargeable battery module.

* * * * *